United States Patent Office 2,806,059
Patented Sept. 10, 1957

2,806,059

PROCESS FOR MAKING DIARYL KETONE POLYCARBOXYLIC ACIDS

Herman A. Bruson, North Haven, and William F. Brill, Meriden, Conn., assignors to Olin Mathieson Chemical Corporation, a corporation of Virginia No Drawing. Application March 30, 1954, Serial No. 419,932

6 Claims. (Cl. 260—517)

This invention relates to a process for making diaryl ketone polycarboxylic acids.

In the prior art, it is known that benzophenone polycarboxylic acids; for example, 2,4'-dicarboxybenzophenone, can be obtained by oxidizing para-toluyl-ortho-benzoic acid in alkaline solution with potassium permanganate (German patent 80,407; Limpricht, Annalen der Chemie, 309, 98) or with an alkaline dichromate solution at high temperatures under pressure (Ogilvie, United States Patent No. 2,202,063). Other benzophenone polycarboxylic acids have been obtained by heating dimethyl benzophenones with nitric acid under pressure (Elbs and Larson, Jour. Prakt. Chemie, (2) 35, 479) or with solutions of potassium dichromate in sulfuric acid (Weiler, Berichte der Deutschen Chem. Ges. 7, 1183).

These processes are expensive when permanganates or chromates are used as oxidizing agents. If nitric acid is employed, the products contain nitro compounds as difficultly removable impurities; and usually the yields are poor.

The object of this invention is to produce diaryl ketone polycarboxylic acids in high yields and of high purity by an economical method.

This is accomplished by subjecting to catalytic oxidation with air or oxygen a substituted diaryl methane or ketone having the formula

R—X—R' wherein X is a member of the group consisting of a methylene radical (—CH$_2$—) and a carbonyl radical

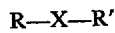

and R and R' are aryl radicals, preferably phenyl or naphthyl, carrying as nuclear substituents at least one alkyl radical containing 1 to 3 carbon atoms and at least one member of the group consisting of an alkyl radical containing 1 to 3 carbon atoms, and a carbonyl-containing radical having the structure

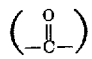

where A is a member of the group consisting of H, OH, and OC$_n$H$_{2n+1}$. Other nuclear substituents, such as chloro- or alkoxy-groups, which are inert to the oxidation, can be present if desired. Typical of these oxidations are the following reactions:

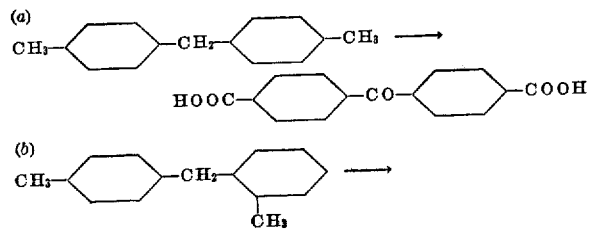

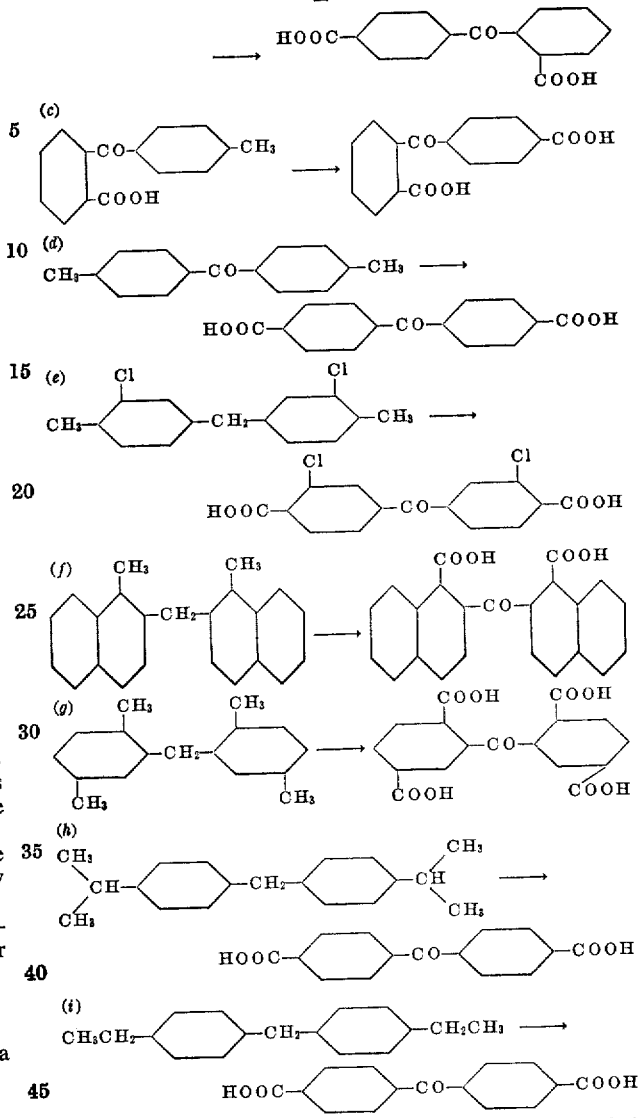

The oxidations illustrated above are effectively carried out according to this invention by bubbling a finely divided gas containing molecular oxygen such as a stream of air or oxygen at elevated temperatures in the range of substantially 60° C. to 200° C. through the R—X—R' compounds, either alone, or preferably in admixture with a suitable solvent and an oxidation catalyst. For maximum yields, the preferred catalyst is a quantity of cobalt salt equivalent to at least 5 percent by weight of cobalt metal on the weight of the R—X—R' compound, in a solvent such as acetic, propionic or butyric acid or in a mixture of solvents such as acetic acid and methyl ethyl ketone. Typical cobalt salts for this purpose are cobalt acetate, propionate, oleate, and naphthenate.

It is already known that catalytic oxidation of aromatic methyl ketones such as acetophenone, cleaves the molecule to yield benzoic acid (U. S. 2,005,183). It is also known that catalytic oxidation of diaryl alkanes, notably dibenzyl, yields benzoic acid and benzaldehyde by cleavage of the molecule (U. S. Patent 2,261,193). It is surprising, therefore, that catalytic oxidation of substituted diaryl methanes or ketones carrying nuclear alkyl or carbonyl-containing groups do not undergo cleavage but oxidize smoothly to the corresponding diaryl ketone polycarboxylic acids.

In order to illustrate this invention, the following examples are given:

*Example 1*

Oxygen was passed through a porous dispersion disk into a rapidly stirred heated mixture of 145 grams mixed isomeric ditolyl ketones, 15 grams of cobaltous acetate tetrahydrate, 650 grams glacial acetic acid and 35 grams of methyl ethyl ketone. The mixture was maintained at 100° C., under a reflux condenser.

After the mixture had turned green, passage of the oxygen was continued for 28 hours at 90° C. When no more oxygen absorption took place, the crystalline insoluble product was filtered off by suction and washed with dilute hydrochloric acid and water, after which it was boiled with 250 grams of ethyl alcohol, filtered and dried. This product was 4,4'-benzophenone dicarboxylic acid. Yield 56.5 grams.

From the alcoholic extract, there was obtained by treatment with water and dilute hydrochloric acid, 14.6 grams of 2,4'-benzophenone dicarboxylic acid. An additional quantity of 83 grams 2,4'-benzophenone dicarboxylic acid was obtained from the original filtered glacial acetic acid solution by dilution with water and partial neutralization of the acetic acid.

The combined yield of benzophenone dicarboxylic acids resulting from the above oxidation was 83% of theory, of which 64% was the 2,4'-isomer and 36% was the 4,4'-isomer.

The mixed isomeric ditolyl ketones employed in the above oxidation was obtained by reacting toluene with carbon tetrachloride and aluminum chloride.

*Example 2*

A 1 liter, three necked flask was equipped with a stirrer, reflux condenser, thermometer and porous glass gas dispersion tube. The flask was charged with 300 grams of glacial acetic acid, 10 grams of cobaltous acetate tetrahydrate and 10 grams of methyl ethyl ketone. Oxygen was passed into the stirred reaction mixture at 100° C. After about 45 minutes, the mixture turned green. At this point 39.2 grams of mixed isomeric ditolyl methanes were added and passage of oxygen was continued at 80° C. for 48 hours with constant stirring. The mixed isomeric ditolyl methane used was obtained by condensing toluene with formaldehyde and sulfuric acid. It contained approximately 70% of 2,4'-dimethyl diphenylmethane, and 30% of 4,4'-dimethyl diphenylmethane.

After cooling the above oxidation product, filtering and working up the precipitate and filtrate as described in Example 1, there was obtained 13.5 grams of 4,4'-benzophenone dicarboxylic acid and 32 grams of 2,4'-benzophenone dicarboxylic acid corresponding to an 85.5% yield.

*Example 3*

In a 500 cc. flask equipped with a thermometer, stirrer, reflux condenser and oxygen inlet tube, there was placed 60.1 grams of para-toluyl-ortho-benzoic acid, 5 g. of cobaltous acetate tetrahydrate, 7 grams of methyl ethyl ketone and 215 grams of glacial acetic acid. The solution was heated with stirring to 105° C. while oxygen which had first passed through a trap containing 25 grams of methyl ethyl ketone was bubbled through. After two hours, during which the solution became green, the temperature was reduced to 85–95° C. Passage of oxygen was continued for 24 hours with rapid stirring. After cooling, the crystalline product was filtered off, washed with hydrochloric acid and water and dried to give 54.7 grams of 2,4'-benzophenone dicarboxylic acid melting at 242–243° C.

Additional product amounting to 6.7 grams of 2,4'-benzophenone dicarboxylic acid was obtained from the acetic acid filtrate. The total yield (61.4 g.) of product was 91 percent of theoretical.

*Example 4*

The procedure described in Example 1 was applied to p,p'-ditolyl ketone. The oxidation gave an 89.5% yield of pure 4,4'-benzophenone dicarboxylic acid melting at 360° C. (on a copper block).

In the same manner as described in Example 2, 3,3'-dichloro- 4,4'-dimethyl diphenyl methane, yields the crystalline 3,3' - dichloro-benzophenone-4,4'-dicarboxylic acid.

Likewise, di-para-xylyl methane, as shown in reaction (g) above, yields the corresponding benzophenone tetracarboxylic acid.

Similarly, 1,1'-dimethyl-2,2'-dinaphthyl methane yields the corresponding di-beta-naphthyl ketone dicarboxylic acid, as shown in reaction (f) above.

These oxidations take place readily at atmospheric pressure. However, pressures higher than atmospheric can be used if desired, notably pressures of the order of 25 to 100 lbs. per square inch. The process can be operated either batchwise or continuously. In the latter case, some of the water formed is preferably removed from the recycle acetic acid solvent in a continuous manner so as not to build up in the process and slow down the reaction. The resulting diaryl ketone polycarboxylic acid products are advantageous for use in the manufacture of esters and other derivatives and as starting materials for the manufacture of synthetic resins.

We claim:

1. A process for preparing diaryl ketone polycarboxylic acids which comprises passing a gas containing molecular oxygen in contact with a substituted diaryl compound having the formula

wherein R and R' are aryl radicals which, respectively, carry as nuclear substituents at least one alkyl radical containing 1 to 3 carbon atoms, and at least one member of the group consisting of an alkyl radical containing 1 to 3 carbon atoms and a carbonyl-containing radical having the structure

where A is chosen from the group consisting of H, OH, and $OC_nH_{2n+1}$ where $n$ is an integer, in the presence of an oxidation catalyst at a temperature of substantially 60° to 200° C.

2. A process as set forth in claim 1, wherein the oxidation catalyst contains a cobalt salt.

3. A process as set forth in claim 1 wherein the oxidation catalyst is dissolved in a solvent chosen from the group consisting of acetic, propionic and butyric acids.

4. A process as set forth in claim 1 wherein the oxidation catalyst is dissolved in a solvent chosen from the group consisting of acetic, propionic and butyric acids containing dissolved methyl ethyl ketone.

5. A process for preparing benzophenone dicarboxylic acid which comprises passing a gas containing molecular oxygen in contact with ditolyl methane in the presence of cobalt acetate, methyl ethyl ketone and acetic acid at a temperature of substantially 60° to 200° C.

6. A process for preparing a diaryl ketone dicarboxylic acid which comprises passing a gas containing molecular oxygen in contact with a diaryl methane containing two nuclear substituted aryl radicals having 1 to 3 carbon atoms in the presence of cobalt acetate, methyl ethyl ketone and acetic acid at a temperature of substantially 60° to 200° C.

References Cited in the file of this patent

UNITED STATES PATENTS

| | | |
|---|---|---|
| 1,502,941 | Curme | July 29, 1924 |
| 1,865,096 | Gassner et al. | June 28, 1932 |
| 2,202,063 | Ogilvie | May 28, 1940 |
| 2,245,528 | Loder | June 10, 1941 |

UNITED STATES PATENT OFFICE

CERTIFICATE OF CORRECTION

Patent No. 2,806,059 September 10, 1957

Herman A. Bruson et al.

It is hereby certified that error appears in the printed specification of the above numbered patent requiring correction and that the said Letters Patent should read as corrected below.

Column 4, line 65, for "aryl radicals" read -- alkyl radicals --.

Signed and sealed this 29th day of October 1957.

(SEAL)
Attest:

KARL H. AXLINE
Attesting Officer

ROBERT C. WATSON
Commissioner of Patents